June 26, 1951
E. S. GANDRUD
2,558,352
AXLE CONSTRUCTION FOR FERTILIZER SPREADERS
Filed May 21, 1949
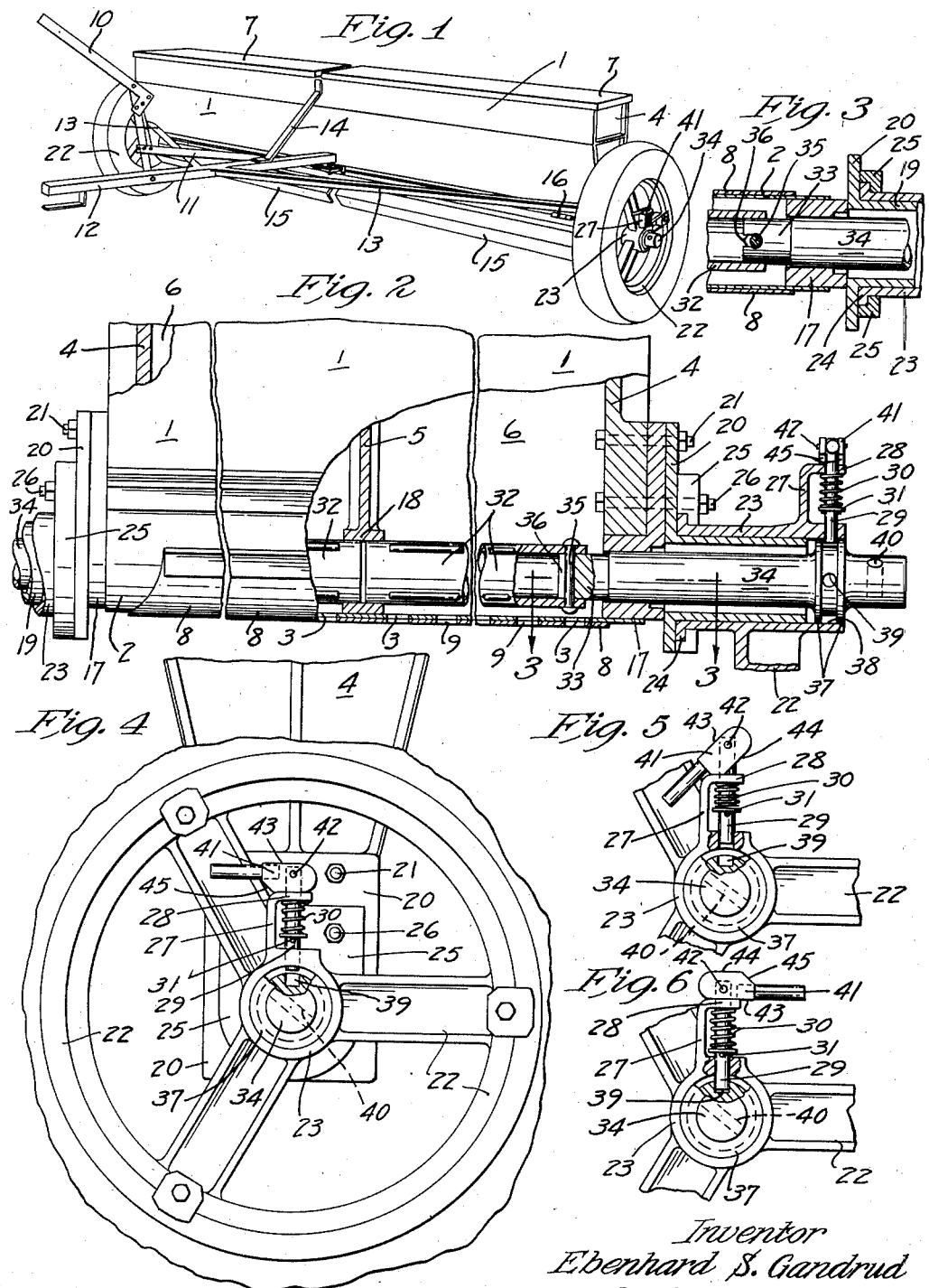
Inventor
Ebenhard S. Gandrud
By his Attorneys
Merchant & Merchant Patented June 26, 1951

2,558,352

UNITED STATES PATENT OFFICE 2,558,352

AXLE CONSTRUCTION FOR FERTILIZER SPREADERS

Ebenhard S. Gandrud, Owatonna, Minn.

Application May 21, 1949, Serial No. 94,651

5 Claims. (Cl. 275—2)

My invention relates generally to improvements in devices of the type disclosed and claimed in my prior Patent No. 2,350,107, issued May 30, 1944, for spreading granular fertilizer, seeds, and the like, and, more particularly, to a novel wheel-mounting and driving mechanism therefor.

An important object of my invention is the provision, in a device including a hopper and rotary agitator therefor, of a novel wheel-mounting and agitator driving mechanism, in which the agitator may be optionally driven from the supporting wheels or disconnected therefrom.

Another highly important object of my invention is the novel combination and arrangement of parts, whereby the agitator and driving connections therefor may be removed with a minimum of time and labor.

A still further important object of my invention is the provision of a device of the type described, which may be manually adjusted by means of positive and quickly accessible mechanism to selectively render the agitator operative or inoperative.

A still further object of my invention is the provision of a device of the class described, which is sturdy in construction, which requires a minimum of parts, and which is durable in use.

The above and still further objects of my invention will become apparent from the following detailed specification, appended claims, and attached drawings.

Referring to the drawings, wherein like characters indicate like parts throughout the several views;

Fig. 1 is a view in perspective of a fertilizer spreader built in accordance with my invention;

Fig. 2 is an enlarged fragmentary view, partly in vertical section and partly in front elevation, of my improved spreader;

Fig. 3 is a fragmentary sectional detail, taken substantially on the line 3—3 of Fig. 2;

Fig. 4 is an enlarged fragmentary view in end elevation of my spreader;

Fig. 5 is a fragmentary view corresponding to a portion of Fig. 4, but showing a different position of some of the parts; and Fig. 6 is a view corresponding to Fig. 5, but showing a still different position of some of the parts.

With reference to the drawings in greater detail, the numeral 1 indicates a hopper preferably formed from sheet metal and having an approximately semi-cylindrical bottom 2 which is provided with longitudinally-spaced discharging passages 3. End plates 4 on opposite ends of hopper 1 and an intermediate partition 5 divide the hopper 1 into separate compartments or chambers 6 that are covered by removable or displaceable lids 7. A valve-acting gate 8 is provided with passages 9 that are alignable with passages 3 in the hopper bottom 2 for the discharging of material from the hopper 1. The gate 8 is secured to the hopper bottom 2 for longitudinal sliding movements thereon by means not shown but fully disclosed in my prior Patent No. 2,350,107. Mechanism for shifting the valve-acting gate 8 includes a jointed control lever 10 and a link 11 (see Fig. 1) suitably coupled to gate-shifting mechanism not shown but which may be assumed to be of the type illustrated in my prior patent above-identified. A draw bar 12 is suitably secured to the hopper 1 and is braced by angularly-disposed brace members 13 and 14. As shown in Fig. 1, a pair of wind guards 15 extend longitudinally of the hopper 1 and are hingedly mounted thereon as indicated at 16.

The end plates 4 of the hopper 1 terminate short of the concave bottom and have rigidly secured to each of their lower end portions, flanged bearings 17 that are in axial alignment with each other and with an intermediate bearing 18 formed in the lower end of the partition 5. A pair of tubular trunnions 19 are axially aligned with and extend outwardly one each of one of the bearings 17 and are provided with flanges 20 that abut the flanges of the bearings 17. Trunnions 19 and bearings 17 are rigidly secured to the end wall 4 by means of nut-equipped bolts 21 extending through the end plates 4, the flanges of bearings 17, and the flanges 20. Journalled on each of the trunnions 19 is a tire-equipped supporting wheel 22 having a hub 23 provided at one end with a circumferentially-extended flange 24. The flange 24 on each hub 23 is adapted to engage the flange 20 of its cooperating tubular trunnion 19 and is limited against axial movement with respect thereto by a pair of retaining plates 25 that are rigidly secured to said flange by means of nut-equipped bolts 26 which extend outwardly of the interior of the hopper 1 (see Fig. 2).

Each hub 23 extends axially outwardly beyond the outer end of each of the trunnions 19 and is provided with a bracket 27 formed to provide an axially-disposed bearing plate 28. A lock pin 29 is mounted for axial sliding movements in aligned apertures in the bearing plate 28 and the extended portion of the hub 23 in a direction radially of the axis of said trunnion 19. Lock pin 29 is biased in a radially inward direction by a coil compression spring 30 disposed between the bearing plate 28 and a washer-equipped pin 31 extending transversely through the intermediate portion of the lock pin 29.

A pair of axially-aligned rotary agitators 32 have their adjacent inner ends journalled in the intermediate bearing 18 and have telescopic driving engagement at their outer ends one each with the reduced inner end 33 of one of a pair of drive shafts 34 that are journalled in the opposite bearings 17. Each of the drive shafts 34 extends axially outwardly of the hub 23 of its cooperating wheel 22. The opposite outer ends of the agitators 32 (one of which is shown) are provided with diametrically-disposed pins 35 which are adapted to be seated in axially-opening slots 36 in the inner reduced end portions 33 of shafts 34. This arrangement provides means for locking each agitator 32 for rotary movement with its cooperating drive shaft 34. It will be seen, particularly with reference to Figs. 1 and 2, that each drive shaft 34 extends axially outwardly of its cooperating hub 23 and is provided with a pair of annular shoulder-forming flanges 37 that are of a diameter to have bearing engagement with the inner surface 38 of the extended portion of the hub 23. Each drive shaft 34 is also provided with a radially outwardly-opening recess 39 disposed between the shoulder-forming flanges 37 immediately adjacent at least one thereof. The recess 39 is axially alignable with the inner end of the lock pin 29 upon rotation of the wheel 22 with respect to its cooperating drive shaft 34. Each of the drive shafts 34 axially outwardly of the hub 23 of its cooperating wheel 22 is provided with an aperture 40 which extends diametrically therethrough for a purpose which will hereinafter be described.

Each lock pin 29 is adapted to be moved to three different positions with respect to the axis of the drive shaft 34, hub 23, and trunnion 19 against bias of its spring 30 by means of a handle-equipped bifurcated cam element 41 pivotally secured to the radially outer end portion of lock pin 29, as indicated at 42. As shown, the cam 41 is provided with surfaces 43, 44, and 45, which are each adapted to engage the bearing plate 28 upon movements about the axis of the pivot 42. The lock pin 29 may be moved to its radially innermost position by rotation of the cam element 41 to the position of Fig. 6, wherein the cam surface 43 is brought into engagement with the bearing plate 28. In this position, it will be noted that the radially inner end of the lock pin 29 is seated in the abutment-forming recess 39 and effectively locks the drive shaft 34 and its cooperating agitator 32 against rotation with respect to the wheel 22.

The lock pin 29 may be moved to its intermediate position, illustrated in Figs. 2 and 4, by rotation of the cam element 41, whereby the cam surface 44 thereof is brought into engagement with the bearing plate 28. In this position, the inner end of the lock pin 29 is withdrawn from the recess 39 but is contained within the channel defined by the shoulder-forming flanges 37, whereby to permit rotation of the cooperating wheel 22 with respect to its drive shaft 34 and associated agitator 32, but prevents axial movement of the drive shaft 34 with respect to the hub 23 of the wheel 22. In this position of the parts, the machine may be moved from one field to another without unnecessary rotation of the agitator 32 and the resultant additional load caused thereby.

When the cam element 41 is moved to the position of Fig. 5, wherein the cam surface 45 engages the bearing plate 28, the lock pin 29 is moved radially outwardly against bias of the spring 30 to a point where the inner end of said lock pin 29 is entirely withdrawn from the channel formed by the flanges 37 and is disposed radially outwardly of the inner surface 38 of the hub 23. With the lock pin 29 in this position, the cooperating drive shaft 34 may be moved axially outwardly from the bearing 17 and out of telescopic engagement with its cooperating agitator 32. The outward movement of the drive shaft 34 may be more easily accomplished if a bar or long pin not shown is inserted through the aperture 40 in the outer end portion of the shaft 34 and used as a handle means for pulling the shaft 34 out of engagement with the bearing 17. As indicated in Figs. 2 and 3, the outer ends of the agitator 32 are axially spaced from the end plates 4 sufficiently to permit their being moved axially outwardly out of engagement with the intermediate bearing 18. When this is done, the agitators 32 may be easily removed from the compartments 6 for cleaning, replacement, repair, or the like.

With the arrangement above-described, the cam elements 41 on each of the wheels 22 may be independently manipulated so that one or the other or both of the agitators 32 may be rotated as desired. Each agitator 32 and its function is independent of the other, and one thereof may be removed without disturbing the other thereof. It will be understood, of course, that the draw bar 12 is adapted to be applied to a tractor or other pulling or pushing means as set forth in my prior patent above-identified.

My invention has been thoroughly tested and found to be adequate for the accomplishment of the objectives set forth; and, while I have disclosed a commercial embodiment of my device, it will be understood that the same is capable of modification without departure from the spirit and scope of the invention as defined in the claims.

What I claim is:

1. In a device of the class described, a hopper, a tubular wheel-supporting trunnion on one end of said hopper, a hub-equipped wheel rotatably mounted on said trunnion, means limiting axial movement of said wheel on said trunnion, a rotatable agitator mounted in said hopper in axial alignment with said trunnion, a drive shaft journalled in said hopper in axial alignment with said agitator and having telescopic engagement therewith, means for locking said drive shaft to said agitator for common rotation, the hub on said wheel projecting axially outwardly of said trunnion to provide a bearing surface on the inner wall thereof, a bracket on said wheel terminating in an axially-disposed bearing plate overlying the extended portion of said hub, a lock pin mounted in said bearing plate and said extended hub portion for sliding movements radially of said hub, yielding means on said lock pin intermediate said bearing plate and said hub biasing said pin in a radially inward direction, a manually adjustable three-position cam element on the outer end of said lock pin, said drive shaft having a recess alignable with said locking pin when said drive shaft is in telescopic driving engagement with said agitator, and an annular shoulder on said drive shaft immediately adjacent said recess, said shoulder defining one side of a flange having bearing contact with the extended inner wall of said hub, said lock pin when moved to its radially innermost position seating in said recess and locking said drive shaft for common rotation with said wheel, said lock pin when moved to its intermediate position engaging said annular shoulder to permit rotation of said wheel independently of said drive shaft but preventing axial movements of said shaft therein, said lock pin when moved to its radially outermost position permitting withdrawal of said drive shaft.

2. In a device of the class described, a hopper, a tubular wheel-supporting trunnion on one end of said hopper, a hub-equipped wheel rotatably mounted on said trunnion, means limiting axial movements of said wheel on said trunnion, a rotary agitator mounted in said hopper in axial alignment with said trunnion, a drive shaft journalled in said hopper and said hub in axial alignment with said agitator, means for locking said drive shaft to said agitator for common rotation, said hub being provided with a radially-extended aperture, means on said hub slidably mounting a lock pin for radial movements in said aperture, a pair of longitudinally-spaced shoulders on said drive shaft defining an annular groove, said groove being alignable with and of a size to snugly receive said lock pin when said drive shaft is in locking engagement with said agitator, a radially-extended opening in said drive shaft within said groove capable of receiving said lock pin, said lock pin when moved to its radially-innermost position being received within said opening and locking said drive shaft for common rotation with said wheel, said lock pin when moved to its intermediate position slidably engaging said shoulders whereby to permit rotation of said wheel independently of said drive shaft but preventing axial movements of said shaft therein, said lock pin when moved to its radially-outermost position permitting withdrawal of said drive shaft.

3. The structure defined in claim 2 in which said hub projects axially outwardly of said trunnion and in which one of said shoulders is positioned within said hub intermediate the radial opening in said drive shaft and the outer end portion of said trunnion.

4. The structure defined in claim 2 in which said lock pin is yieldingly biased toward its radially innermost position.

5. The structure defined in claim 2 in which said lock pin is yieldingly biased toward its radially innermost position, and in further combination with a manually adjustable three-position cam element on the radially inner end of said lock pin.

EBENHARD S. GANDRUD.

REFERENCES CITED

The following references are of record in the file of this patent:

UNITED STATES PATENTS

| Number | Name | Date |
| --- | --- | --- |
| 876,076 | Mylor et al. | Jan. 7, 1908 |
| 2,350,107 | Gandrud | May 30, 1944 |